United States Patent [19]

Mori

[11] Patent Number: 5,042,738
[45] Date of Patent: Aug. 27, 1991

[54] WEBBING LOCK DEVICE FOR WEBBING RETRACTOR

[75] Inventor: Shinji Mori, Aichi, Japan

[73] Assignee: Kabushiki Kaisha Tokai-Rika Denki-Seisakusho, Aichi, Japan

[21] Appl. No.: 464,323

[22] Filed: Jan. 12, 1990

[30] Foreign Application Priority Data

Jan. 19, 1989 [JP] Japan .................. 1-4978[U]

[51] Int. Cl.$^5$ .............. B65H 75/48; B60R 22/36
[52] U.S. Cl. ............... 242/107.40 B; 242/107.40 A; 280/806
[58] Field of Search ............ 242/107.4 B, 107.7, 242/107.4 A; 280/801, 803, 806, 807

[56] References Cited

U.S. PATENT DOCUMENTS

| | | | |
|---|---|---|---|
| 3,819,126 | 6/1974 | Stoffel | 242/107.4 B X |
| 4,687,156 | 8/1987 | Mori | 242/107.4 B X |
| 4,729,523 | 3/1988 | Saitou et al. | 242/107.4 B X |
| 4,749,142 | 6/1988 | Saitow | 242/107.4 B X |
| 4,844,375 | 7/1989 | Ballet | 242/107.4 B X |
| 4,905,928 | 3/1990 | Katsuno et al. | 242/107.4 B |

FOREIGN PATENT DOCUMENTS

| | | |
|---|---|---|
| 3342478 | 5/1984 | Fed. Rep. of Germany ... 242/107.4 B |
| 44-16969 | 9/1969 | Japan . |
| 47-1115 | 1/1972 | Japan . |
| 61-161160 | 3/1985 | Japan . |
| 2134372 | 8/1984 | United Kingdom ......... 242/107.4 B |

Primary Examiner—Daniel P. Stodola
Assistant Examiner—John P. Darling
Attorney, Agent, or Firm—Sixbey, Friedman Leedom & Ferguson

[57] ABSTRACT

A webbing lock device for a webbing retractor in which a takeup shaft is locked and prevented from rotating in a webbing drawing-out direction when the takeup shaft has rotated by a predetermined amount in the webbing drawing-out direction after meshing engagement between a lock wheel and a pawl lever. The webbing lock device is provided with a ratchet wheel which is disposed coaxially with the takeup shaft and has around an outer peripheral portion thereof external ratchet teeth capable of meshing with the pawl lever. The ratchet wheel is adapted to receive a rotating force of the takeup shaft in the webbing drawing-out direction via a frictional force when the takeup shaft rotates in the webbing drawing-out direction, while the ratchet wheel is rotated integrally with the takeup shaft by engaging with the takeup shaft when the takeup shaft rotates in a webbing taking-up direction. The pawl lever is spaced apart from the lock wheel by the external ratchet tooth when an amount of rotation of the takeup shaft in the webbing taking-up direction with the lock wheel meshing with the pawl lever is less than the predetermined amount. As a result, since the pawl lever is forcedly spaced apart from the lock wheel by the ratchet wheel when the takeup shaft rotates in the webbing taking-up direction, an increase in the tension of the webbing is prevented when the vehicle is run on a rough road.

17 Claims, 8 Drawing Sheets

WEBBING LOCK DEVICE FOR WEBBING RETRACTOR'

BACKGROUND OF THE INVENTION

1. Field of the Invention

The present invention relates to a webbing lock device for a webbing retractor which is used for a seatbelt system for protecting a seat occupant of a vehicle at the time of a sharp deceleration of the vehicle speed and is adapted to prevent the drawing out of the webbing for restricting the occupant at the time of a sharp deceleration of the vehicle speed.

2. Description of the Related Art

In a seatbelt system, one end of a webbing for restricting a seat occupant of a vehicle is taken up by a webbing retractor which incorporates a webbing lock device for preventing the drawing out of the webbing at the time of a sharp deceleration of the vehicle speed.

This lock device is provided with a lock wheel which is adapted to follow the rotation of a takeup shaft in the direction of the drawing out of the webbing by a predetermined urging force. The arrangement is such that, at the time of a sharp deceleration of the vehicle, a pawl lever is engaged with the lock wheel through an acceleration detecting means so as to cause a delay in the rotation of the lock wheel so that lock teeth which rotate together with the takeup shaft are made to project radially from the takeup shaft, thereby causing the lock teeth to mesh with lock teeth of a frame (refer to Japanese Patent Publication No. 16969/1969 and Japanese Patent Laid-Open No. 1115/1972).

With such a conventional lock device, however, if the vehicle is run a bumpy, rough road, there are cases where the acceleration detecting means remains actuated, with the result that the lock device remains in a locked state, thereby making it impossible for the occupant to draw out the webbing. Furthermore, during running on a rough road, the occupant undergoes up-and-down motion repeatedly due to vibrations. As a result, the meshing position between the lock pawl and the lock teeth gradually advances when the webbing is taken up, so that the webbing is gradually taken up by the retractor, possibly increasing the pressure applied to the occupant.

Consequently, the present applicant has proposed a lock device for a webbing retractor which prevents the webbing from being taken up gradually by the retractor even when the webbing is taken up and drawn out repeatedly by a predetermined length (refer to Japanese Utility Model Laid-Open No. 161160/1986).

The lock device in accordance with the aforementioned art comprises a ratchet wheel which rotates by receiving the rotating force of the takeup shaft via a frictional force and has a ratchet wheel formed around its outer periphery which corresponds with the pawl lever, and the pawl lever is forcedly spaced apart from the lock wheel by means of the ratchet wheel when the takeup shaft rotates in the webbing taking-up direction, thereby preventing the webbing from being kept taken up.

However, this arrangement requires a frictional member and associated parts for imparting the frictional force between the takeup shaft and the ratchet wheel, resulting in an increased number of parts used and a decline in efficiency in the assembling operation. In addition, the frictional force of the frictional member must be set in such a manner as to be greater than a predetermined frictional force imparted between the lock wheel and the takeup shaft and capable of positively pressing down the pawl lever to cause the same to be spaced apart from the lock wheel. On the other hand, if this frictional force is made excessively large, wear between the contact surfaces of the takeup shaft and the ratchet wheel is disadvantageously promoted when the takeup shaft and the ratchet wheel rotate relative to each other after the actuation of the pawl lever.

SUMMARY OF THE INVENTION

Accordingly, an object of the present invention is to provide a lock device for a webbing retractor which is capable of preventing a webbing from being taken up when a vehicle is run on a rough road.

Another object of the present invention is to provide a lock device for a webbing retractor which is capable of reducing the wear of contact surfaces of a takeup shaft and a ratchet wheel by allowing the takeup shaft and the ratchet wheel to rotate relative to each other under a light frictional force during actuation of a pawl lever and to positively rotate as a unit when the takeup shaft rotates in a webbing taking-up direction.

To these ends, in accordance with the present invention, there is provided a webbing lock device for a webbing retractor, comprising: a lock wheel having ratchet teeth around an outer peripheral portion thereof and adapted to follow, by an urging force, the rotation of a takeup shaft in a webbing-drawing-out direction, for taking up a webbing worn by a seat occupant of a vehicle; a pawl lever for meshing engagement with one of the ratchet teeth so as to cause the lock wheel to undergo a delay in rotation relative to the takeup shaft; a lock device for stopping the rotation of the takeup shaft in the webbing drawing-out direction when the takeup shaft is rotated in the webbing drawing-out direction by a predetermined amount relative to the lock wheel as a result of the drawing out of the webbing after the lock wheel meshes with the pawl lever; and a ratchet wheel which is disposed coaxially with the takeup shaft and has around an outer peripheral portion thereof external ratchet teeth capable of meshing with the pawl lever, the ratchet wheel being adapted to receive a rotating force of the takeup shaft in the webbing drawing-out direction via a frictional force when the takeup shaft rotates in the webbing drawing-out direction, while the ratchet wheel is rotated integrally with the takeup shaft by engaging with the takeup shaft when the takeup shaft rotates in a webbing taking-up direction, whereby the pawl lever is spaced apart from the lock wheel by the external ratchet teeth when an amount of rotation of the takeup shaft in the webbing taking-up direction with the lock wheel meshing with the pawl lever is less than the predetermined amount.

In the normal state of running of the vehicle, the ratchet wheel rotates by receiving the rotating force of the takeup shaft via a frictional force. Therefore, the ratchet wheel and the takeup shaft do not rotate relative to each other, so that it is unnecessary to increase the winding force of the take-up shaft. When the vehicle speed is suddenly decelerated, the webbing is drawn out by the intertia of the occupant. At this time, however, the lock wheel undergoes a delay in rotation relative to the takeup shaft by means of the pawl lever. When the webbing is drawn out by a predetermined amount after the occurrence of this delay in rotation, the lock means is actuated, so that the rotation of the takeup shaft in the webbing drawing out direction can be stopped, thereby enabling the occupant to be restricted.

In addition, when the vehicle is run on a rough road, the lock means repeats the locking and unlocking operations. In the present invention, however, the ratchet wheel is rotated integrally with the takeup shaft when the takeup shaft rotates in the webbing taking up direction, and the pawl lever is forcedly spaced apart from the lock wheel by the ratchet wheel for an amount of webbing take up which is smaller than the aforementioned predetermined amount, after rotation of the takeup shaft in the webbing drawing-out direction. By virtue of this arrangement, during an ensuing webbing drawing out operation, the lock wheel meshes with the pawl lever either at the same position as in an initial locked state or in a state in which the lock wheel has rotated in the webbing drawing out direction. In consequence, even when the webbing is repeatedly taken up and drawn out a plurality of times by predetermined amounts, the webbing is not gradually taken up any further, so that no uncomfortable pressure is applied to the occupant.

When the takeup shaft rotates in the webbing drawing out direction with the pawl lever operating, the takeup shaft and the ratchet wheel rotate relative to each other, and a frictional force occurring at this time may be light. On the other hand, when the takeup shaft rotates in the webbing taking up direction, it is necessary to positively transmit the rotating force of the takeup shaft to the ratchet wheel. In the present invention, the takeup shaft and the ratchet wheel are connected to each other via a frictional force, and the ratchet wheel and the takeup shaft are made to engage with each other without resorting to the frictional force so as to rotate integrally with each other only during the taking up of the webbing when the relative rotation of the ratchet wheel is stopped. Accordingly, it is possible to reduce the friction of contact surfaces of the takeup shaft and the ratchet wheel and positively effect the operation of spacing the pawl lever apart from the lock wheel. In addition, there is no need to take into consideration the urging force of the lock wheel with respect to the takeup shaft.

The above and other objects, features and advantages of the present invention will become more apparent from the following detailed description of the invention when read in conjunction with the accompanying drawings.

DESCRIPTION OF THE PREFERRED EMBODIMENTS

Figure 1:
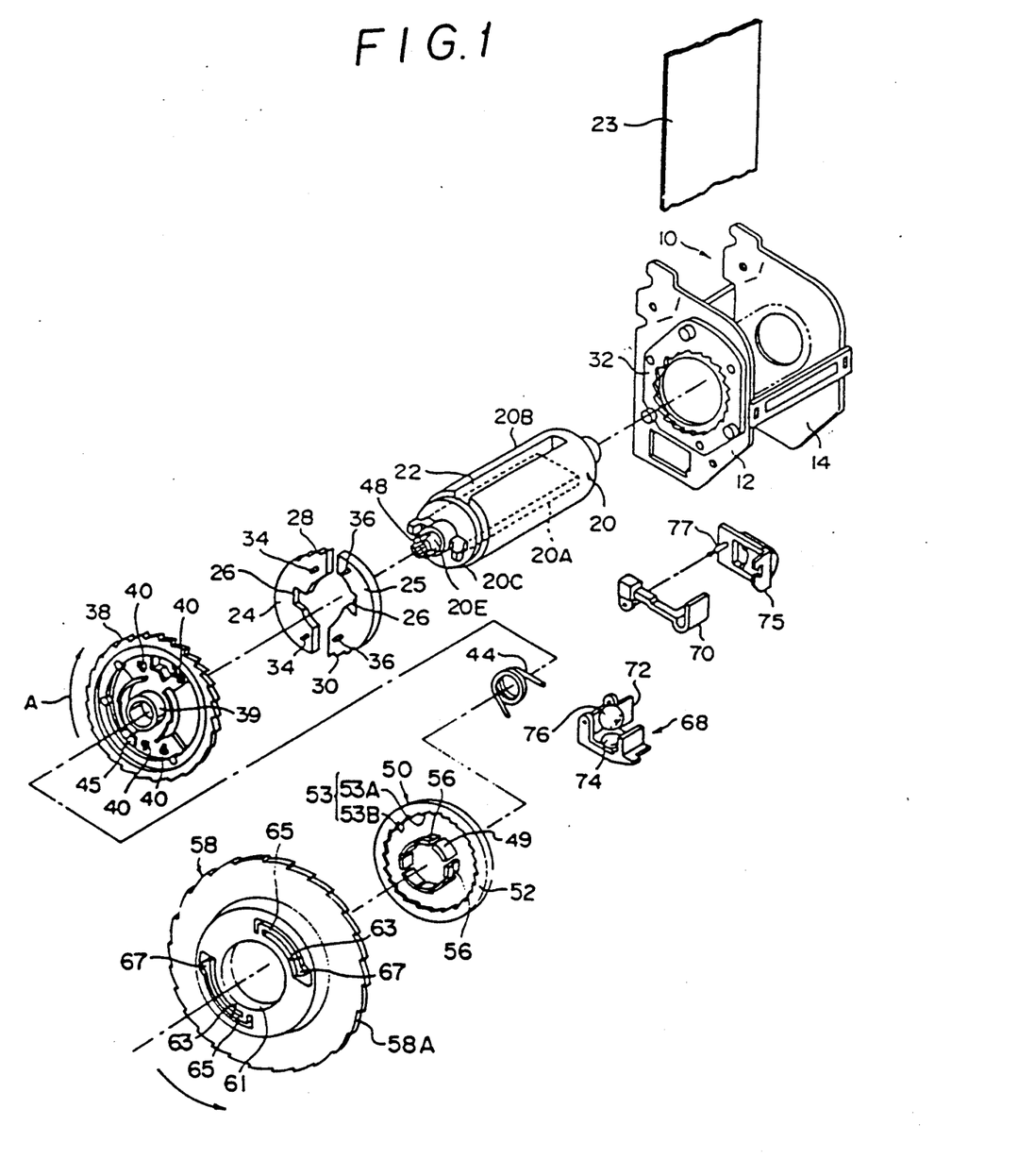
FIG. 1 is an exploded perspective view of a webbing retractor incorporating a lock device in accordance with an embodiment of the present invention.

FIG. 1 is an exploded perspective view of a webbing retractor incorporating a lock device in accordance with an embodiment of the present invention. In this webbing retractor, a frame 10 is secured to a chassis of a vehicle by means of unillustrated fixing bolts. A pair of leg plates 12, 14 extend from opposite side portions of the frame 10 in such a manner as to be parallel with each other.

Figure 2:
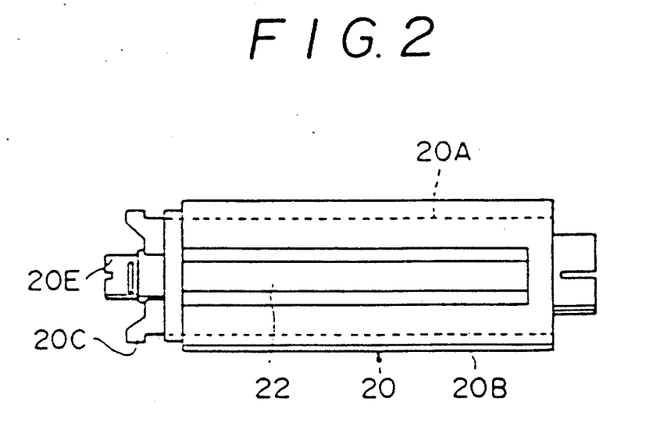
FIG. 2 is a side elevational view illustrating a takeup shaft.

Opposite end portions of a takeup shaft 20, also shown in FIG. 2, are rotatably supported by the leg plates 12, 14. A slot 22 is formed in a central portion of the takeup shaft 20 extending radially inward, one end of a webbing 23 for restricting a seat occupant being retained in this slot 22. The webbing 23 whose one end is thus retained is taken up by the takeup shaft 20 in the form of a roll. The occupant is capable of wearing an intermediate portion of the webbing by engaging a tongue plate (not shown) attached to the other end of the webbing 23 with a buckle device (not shown) fixed to the chassis.

The takeup shaft 20 has a synthetic resin layer 20B integrally formed around a core 20A formed of a thick plate member and is formed into an external configuration of a cylindrical column.

An unillustrated power spring is retained at one end (the leg plate 14 side) of this synthetic resin layer 20B and urges the takeup shaft 20 in the direction of taking up the webbing.

An end portion of the core 20A projects from the other end of the synthetic resin layer 20B and constitutes a projecting portion 20C.

Figure 3:
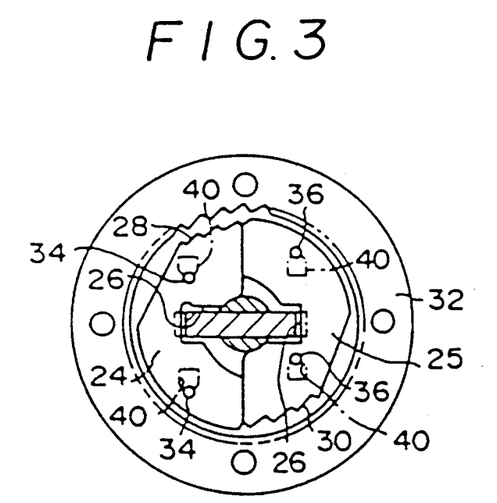
FIG. 3 is a front elevational view illustrating a relational correspondence between a lock plate and an internal ratchet wheel.

A pair of lock plates 24, 25, which constitute parts of a lock device shown in FIG. 1, are disposed around the projecting portion 20C. Each of these lock plates 24, 25 has a substantially U-shaped notch 26 in its central portion and is substantially C-shaped. The lock plates 24, 25 are adapted to rotate together with the takeup shaft 20 with the projecting portion 20C inserted in the notches 26. The width of the notch 26 is formed to be slightly larger than the width of the projecting portion 20C, as shown in FIG. 3, so that the lock plates 24, 25 are capable of rotating relative to the takeup shaft 20 by a predetermined angle.

Pawl portions 28, 30 are respectively formed at portions of the lock plates 24, 25 at outer peripheries thereof. The lock plates 24, 25 are disposed on the inner side of lock teeth of an internal ratchet wheel 32 secured to the leg plate 12 so that the pawl portions 28, 30 oppose the lock teeth.

Furthermore, the lock plates 24, 25 are respectively provided with a pair of pins 34, 36 projecting therefrom, the pins 34, 36 being inserted in respective elongated holes 40 formed in a lock wheel 38. The lock wheel 38 is rotatably supported by a small-diameter shaft portion 20E projecting from an axial portion of the takeup shaft 20, via a boss 39 formed on its central portion, so that the lock wheel 38 is rotatable relative to the takeup shaft 20.

In addition, a torsion coil spring 44 is supported by the boss 39 coaxially with the lock wheel 38. The torsion coil spring 44 has one end secured to a rotating wheel portion 42 of a rotor 50 fitted to an end portion of a small-diameter shaft portion 20E and the other end abuts against a retaining pin 45 projecting front he lock wheel 38. The lock wheel 38 is rotatively urged in a direction in which the takeup shaft 20 rotates when the webbing is drawn out (in the direction of arrow A in FIG. 1) by receiving the urging force of the torsion coil spring 44. Accordingly, by virtue of the urging force of the torsion coil spring 44, the lock wheel 38 accommodates the pins 34, 36 of the lock plates 24, 25 at ends of the elongated holes 40, thereby causing the pawl portions 28, 30 to be spaced apart from the teeth of the internal ratchet wheel 32, as shown in FIG. 3.

Figure 4:
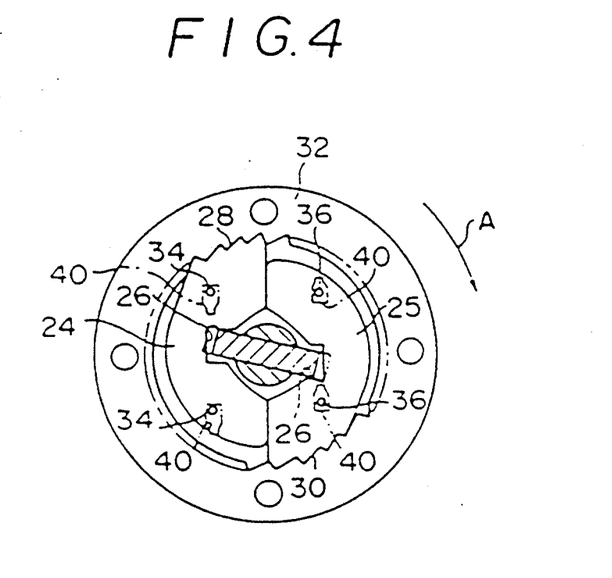
FIG. 4 is an operational diagram of FIG. 3.
Figure 5:
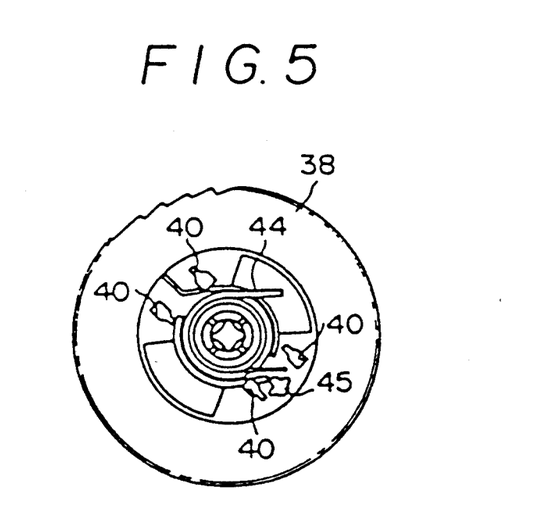
FIG. 5 is a diagram illustrating a lock wheel and a torsion coil spring assembled together.

However, when relative rotation occurs between the lock wheel 38 and the takeup shaft 20 rotating in the webbing drawing-out direction, and the rotation of the lock wheel 38 undergoes a delay in rotation against the urging force of the torsion coil spring 44, the arrangement is such that when this rotational delay occurrs, the lock plates 24, 25 are guided in the longitudinal directions of the elongated holes 40, whereby the pawl portions 28, 30 mesh with the teeth of the internal ratchet wheel 32, as shown in FIG. 4.

Figure 6:
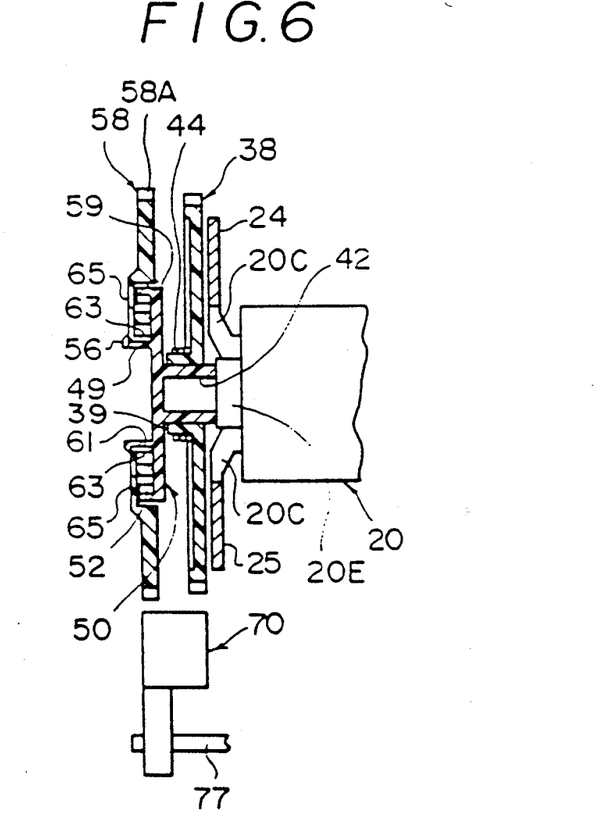
FIG. 6 is a cross-sectional view illustrating various members attached to the takeup shaft.
Figure 7A:
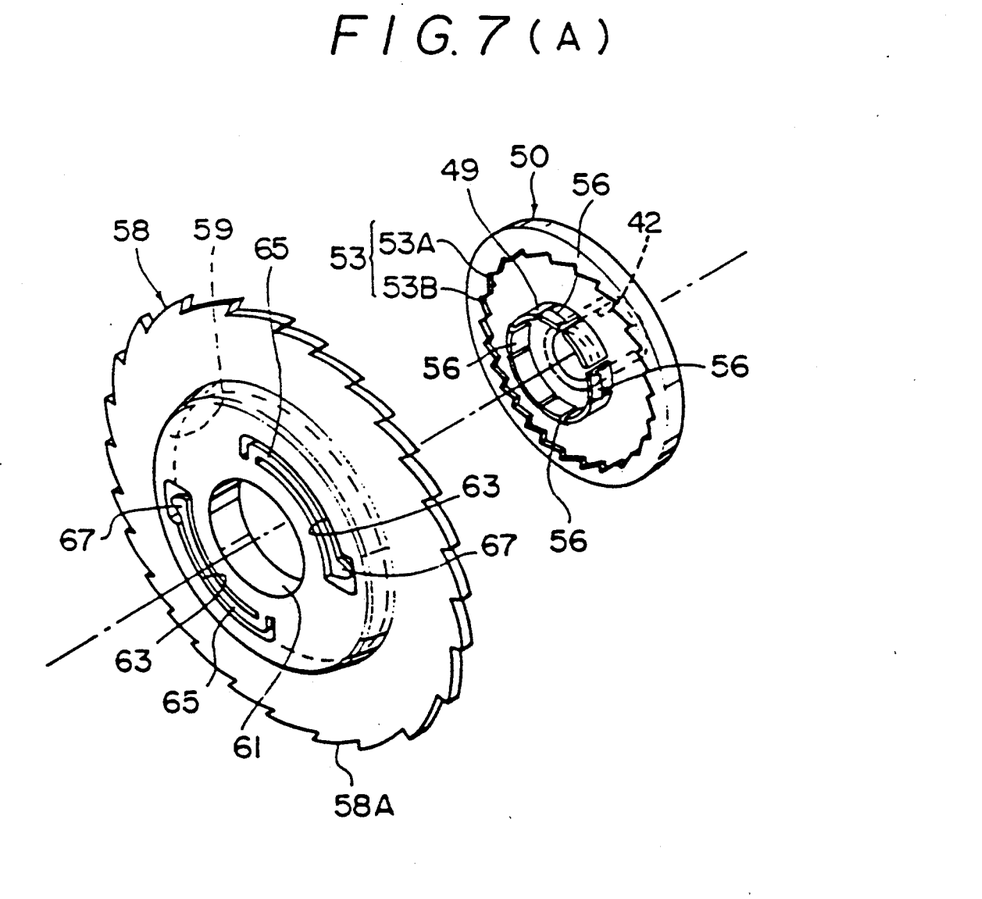
FIG. 7A is an exploded perspective view illustrating a manner in which a ratchet wheel and a rotor are assembled together.
Figure 7B:
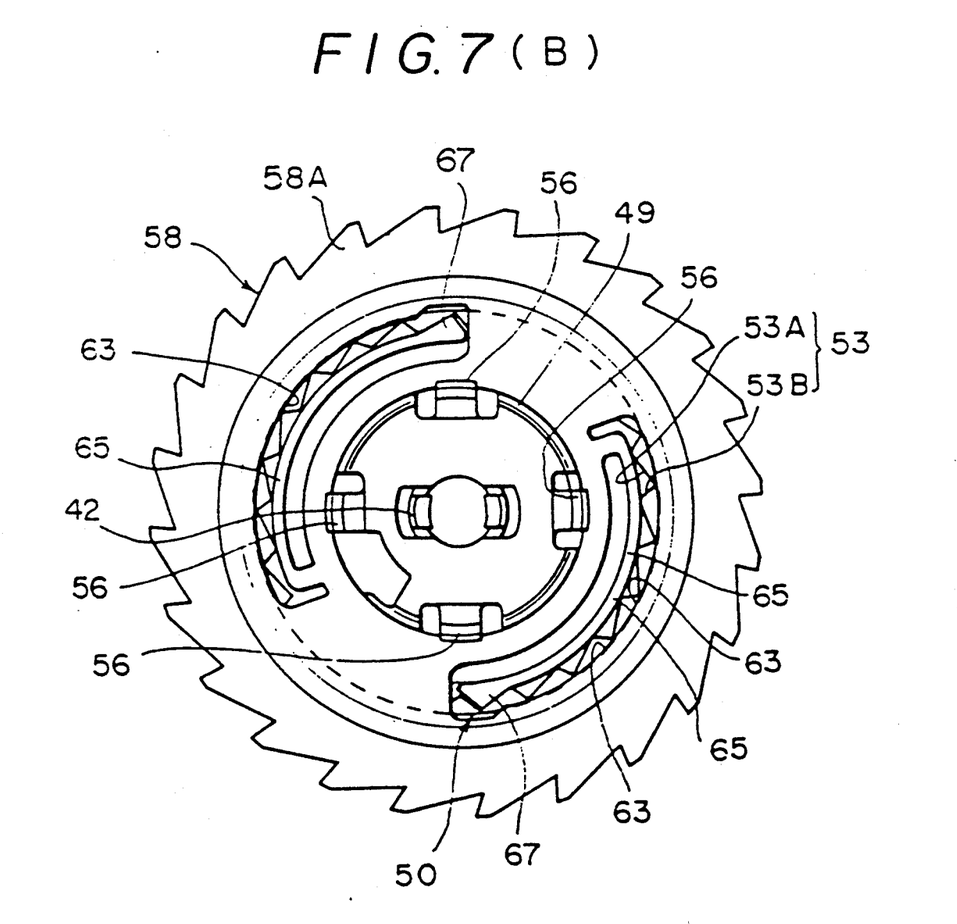
FIG. 7B is a front elevational view illustrating the ratchet wheel and the rotor assembled together.

As shown in FIG. 6, the rotor 50 is arranged such that a pair of locating lugs (not shown) formed at the tip of the rotating wheel portion 42 enter square holes 48 (see FIG. 1) formed in the end of the takeup shaft 20, so that the rotor 50 is retained by the takeup shaft 20 and is thereby adapted to rotate integrally with the takeup shaft 20.

The rotor 50 has a rib 52 formed around the periphery thereof with its thickness enlarged in an axial direction, internal teeth 53 being formed on an inner peripheral surface of the rib 52. In addition, the rotor 50 has a hollow cylindrical portion 49 formed in a radially intermediate portion thereof in such a manner as to project axially therefrom. The hollow cylindrical portion 49 has equidistanced notches, and four claws 56 are thereby formed projecting from a base portion of the hollow cylindrical portion 49. Tips of the claws 56 are bent in the radially outward direction of the rotor 50.

The rotor 50 is accommodated in a circular recess 59 formed concentric with the axis of the ratchet wheel 58. As shown in FIGS. 8A to 8E, the ratchet wheel 58 has a toothed portion (the teeth being specifically illustrated as including an addendum 58A, a bottom 58B, and a back face 58C) formed around the outer periphery thereof. In this embodiment, the number of teeth of the ratchet wheel 58 and of the internal teeth 53 are set to be identical; however, it suffices if the number of the internal teeth 53 is an integer multiple of that of the teeth of the ratchet wheel 58. A circular hole 61 is provided in a central portion of the recess 59 and the hollow cylindrical portion 49 of the rotor 50 is inserted in the hole 61 and is rotatably supported therein. In this case, the arrangement is such that the claws 56 are resiliently deformed to fit over edges of the circular hole 61, so that the rotor 50 is held in such a manner as to be accommodated in the recess 59. Accordingly, the ratchet wheel 58 is adapted to rotate by following the rotation of the rotor 50 due to a predetermined frictional force exerted by the resiliency of the claws 56.

A pair of elongated holes 63 that are curved in an arcuate manner along a peripheral edge of the circular hole 61 are formed in the bottom of the recess 59. An arm 65 is formed in each elongated hole 63 in such a manner as to extend from one end of the elongated hole 63 in an arcuate manner. The thickness of each arm 65 is enlarged in such a manner as to project inwardly of the recess 59. A retaining claw 67 is formed on a distal end of each arm 65 and its thickness is enlarged in the same way as the arm 65 so that the retaining claw 67 is made to correspond to one of the internal teeth 53. In a state in which these retaining claws 67 are accommodated in the recess 59 of the rotor 50, the retaining claws 67 are urged by virtue of the resiliency of the arms 65 in a direction in which the retaining claws 67 are engaged with the internal teeth 53.

The arrangement is such that when the rotor 50 rotates in the webbing drawing out direction in a state in which the rotation of the ratchet wheel 58 is prevented by a pawl lever 70 which will be described later, each of the retaining claws 67 is pushed radially inwards by a gradually inclined surface 53A of one of the internal teeth 53 against the resiliency of the arms 65 so as to undergo relative rotation. In addition, when the rotor 50 rotates in the webbing taking up direction, a sharply inclined surface 53B of one of the internal teeth 53 is brought into contact with each of the retaining claws 67 so as to rotate the ratchet wheel 58 together with the rotor 50.

In addition, the radius of the ratchet wheel 58 at a distal end of its teeth portion is set to be slightly greater than that of the lock wheel 38 at a distal end of its teeth portion, so that the pawl lever 70 which pivots by means of an acceleration sensor 68, is adapted to mesh with the ratchet wheel 58 earlier than it does with the lock wheel 38. Each back face 58C of the teeth portion of the ratchet wheel 58 is inclined so that the pawl lever 70 is pivotally pushed out clockwise, as viewed in FIG. 8D, by the back face 58C when the ratchet wheel 58 has received a rotating force in the webbing taking up direction after meshing with the pawl lever 70 at its bottom 58B, as shown in FIG. 8C.

The pawl lever 70 is pivotally supported by a pin 77 secured to a bracket 75 fixed to the leg plate 12 and is adapted to abut against a ball 76 disposed in a concave receiving portion 74 formed in a case 72.

The acceleration sensor 68 is arranged such that the ball 76 rises up a curved surface of the concave receiving portion 74 when an acceleration acts on the ball 76.

When the ball 76 is pushed upward, the ball 76 causes the pawl lever 70 to pivot about the pin 77, so that the distal end of the pawl lever 70 is meshed with the ratchet wheel 58 and the lock wheel 38.

A description will now be given of the operation of this embodiment.

Figure 8A:
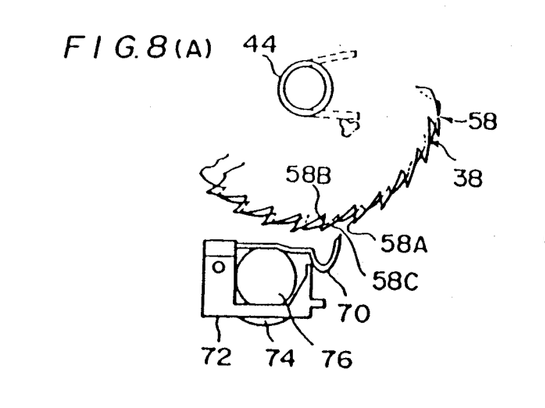
FIGS. 8A to 8E are diagrams illustrating how the ratchet wheel, a pawl lever, and their associated parts operate.
Figures 8B, 8C, 8E:
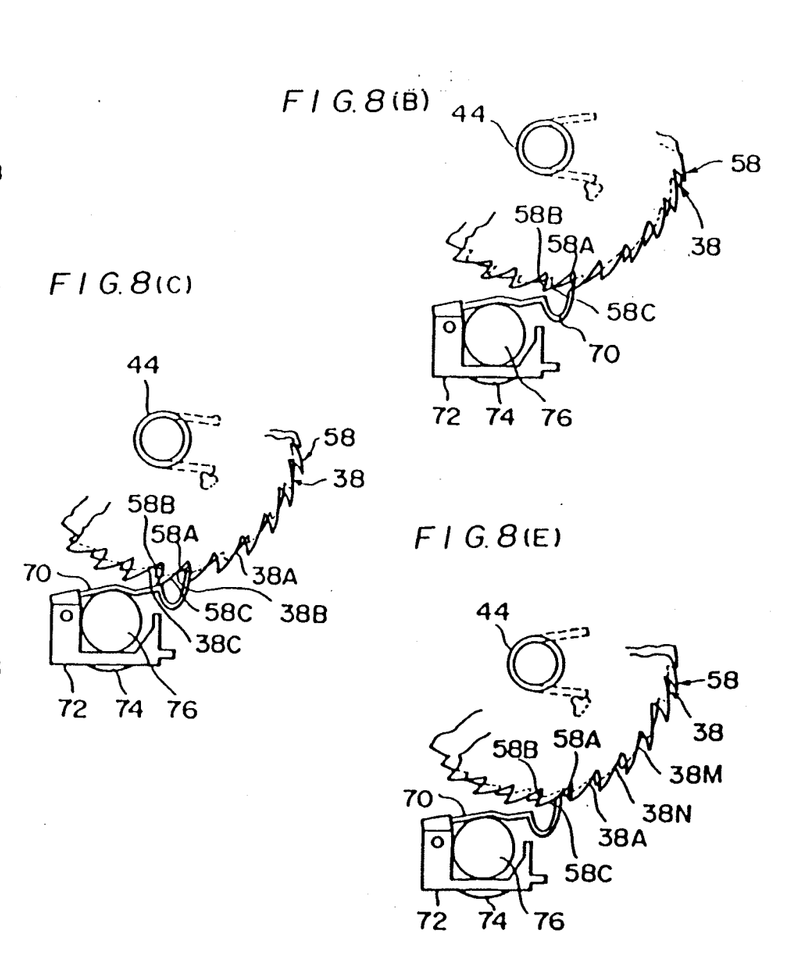

In a normal state of the vehicle, the pawl lever 70 is spaced apart from the ratchet wheel 58 and the lock wheel 38, as shown in FIG. 8A. Consequently, the occupant after putting on the webbing is capable of assuming a free driving posture by taking up the webbing from the takeup shaft 20 or paying it out therefrom, as desired.

When the vehicle is sharply decelerated the ball 76 rises up the curved surface of the concave receiving portion 74, as shown in FIG. 8B, and pivots the pawl lever 70 so that it engages with the addendum 58A of the ratchet wheel 58, thereby stopping the rotation of the ratchet wheel 58. After the rotation of the ratchet wheel 58 is stopped, if the takeup shaft 20 is further rotated in the webbing drawing-out direction, then since each of the retaining claws 67 are pressed by a gradually inclined surface 53A of one of the teeth of the internal gear 53 and hence pushed radially inwards against the resiliency of the arm 65, the relative rotation of the takeup shaft 20 and the ratchet wheel 58 is permitted. As a result, it is possible to align the addenda of the teeth of the ratchet wheel 58 and the lock wheel 38, so that the pawl lever 70 can be also meshed with the lock wheel 38.

In this case, if the bottoms 58B of the teeth portion are inclined in conformity with the configuration of the tip of the pawl lever 70 (i.e., into a saw tooth configuration in which the bottoms are inclined with respect to the radial direction of the ratchet wheel 58), it is possible to produce a force which causes the pawl lever 70 to mesh with the lock wheel 38 when it is brought into contact with the addendum 58A.

Meanwhile, since the occupant moves in the direction of the acceleration by means of inertia, the webbing is drawn out from the takeup shaft 20, so that the takeup shaft 20 rotates clockwise as viewed in FIGS. 8A to 8E. At this time, the takeup shaft 20 and the lock wheel 38 undergo relative rotation since the lock wheel 38 is prevented from rotating by the pawl lever 70.

This relative rotation causes the torsion coil spring 44 to be deformed, as shown in FIG. 8C. Also the pins 34, 36 of the lock plates 24, 25 which rotate together with the takeup shaft 20, are guided by the elongated holes 40 provided in the lock wheel 38, and the pawl portions 28, 30 mesh with the teeth of internal ratchet wheel 32 as shown in FIG. 4, thereby preventing the takeup shaft 20 from rotating further in the webbing drawing-out direction. Consequently, the occupant is restrained positively by the webbing. That is, by drawing out the webbing by a predetermined amount after the rotation of the lock wheel 38 is prevented, the pawl portions 28, 30 can be made to mesh with the teeth of the internal ratchet wheel 32.

When the vehicle is run on a bumpy, rough road, since the occupant moves up and down due to the bouncing of the vehicle, the webbing is repeatedly drawn out from and taken up by the takeup shaft 20.

In this case, with a conventional webbing retractor, when the webbing is taken up, the lock wheel 38 which has rotated counterclockwise from the state shown in FIG. 8C rotates by one tooth or more and meshes again with the pawl lever 70, so that the webbing is gradually taken up by the takeup shaft 20. In other words, in a case where a ratchet tooth 38A of the lock wheel 38 initially meshes with the pawl lever 70 in the state shown in FIG. 8C, due to the bouncing of the vehicle, a ratchet tooth 39B and a ratchet tooth 38C successively mesh with the pawl lever 70 so that the webbing is gradually taken up by the takeup shaft 20.

Figure 8D:
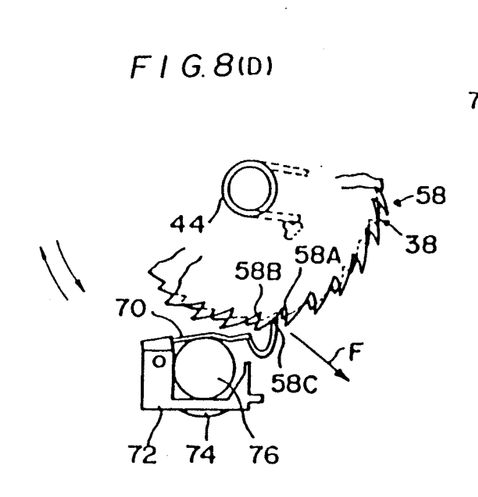

In this embodiment, however, in the state shown in FIG. 8D, each of the retaining claws 67 which has received the rotation of the takeup shaft 20 in the webbing taking-up direction by being brought into contact with the sharply inclined surface 53B of the internal tooth 53, imparts a counterclockwise rotating force (in the webbing taking-up direction) to the ratchet wheel 58. As a result, the pawl lever 70 is forcedly pushed out and spaced apart from the lock wheel 38 (see arrow F in FIG. 8D) by the back face 58C of the ratchet wheel 58 before the lock wheel 38 is rotated in the webbing taking-up direction by the urging force of the torsion coil spring 44, that is, while the webbing is taken up by a smaller amount than the aforementioned predetermined amount of webbing take up. Since the retaining claws 67 are pressed in the direction of the internal teeth 53, the retaining claws 67 and the internal teeth 53 can maintain a meshing state, so that the pawl lever 70 can be positively spaced apart from the teeth portion of the lock wheel 38.

As a result, as shown in FIG. 8E, the moment the pawl lever 70 is spaced apart from the lock wheel 38, the lock wheel 38 rotates clockwise by the urging force of the torsion coil spring 44. Subsequently, even if due to bumping of the vehicle, the takeup shaft 20 is rotated in the webbing drawing-out direction, the pawl lever 70 meshes again with the lock tooth 38A, or a lock tooth 38M or 38N, with the result that the takeup shaft 20 is locked in the same state as the previous one or in a state in which it has rotated by an amount of one or two teeth of the lock wheel 38 more than the amount of rotation in the webbing drawing-out direction. Hence, the webbing is prevented from becoming gradually taken up by the takeup shaft 20.

Thus, in accordance with this embodiment, the occupant is able to assume a comfortable riding state since the webbing is not gradually taken up by the takeup shaft even if the vehicle is run on a rough road.

In addition, during the normal drawing-out and taking-up operation of the takeup shaft 20, since the ratchet wheel 58 rotates together with the takeup shaft 20 with a light frictional force, practically no resistance acts against the winding force of the takeup shaft 20. Hence, the spring force required for taking up can be reduced, while the pressure applied to the occupant can be mitigated. Also, it is possible to reduce the strength of the power spring for imparting a winding force to the takeup shaft 20.

The present invention is applicable to any lock device in which a lock wheel rotates relative to a takeup shaft, and a lock plate meshes with lock teeth in a frame so as to prevent the takeup shaft from rotating when drawing out the webbing.

In addition, it goes without saying that a structure other than the aforementioned ball is applicable as the acceleration sensor in accordance with the present invention.

Figure 9:
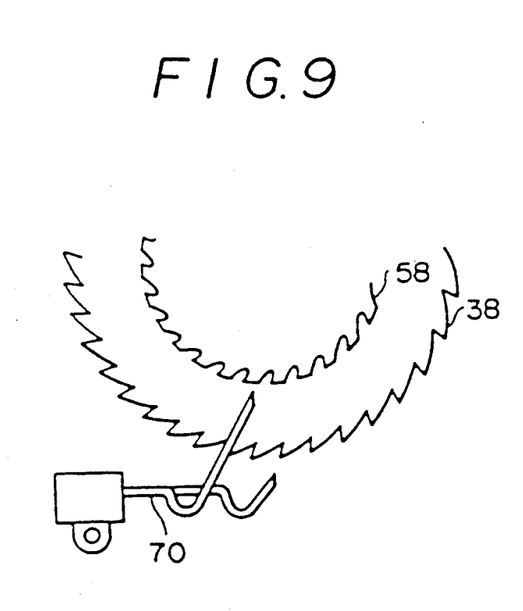
FIG. 9 is a front elevational view for a case where a distal end of the pawl lever is bifurcated so as to correspond to the ratchet wheel and the lock wheel, respectively.

Although in the above-described embodiment one pawl lever 70 is provided for meshing with the lock wheel 38 and the ratchet wheel 58, it is possible to adopt the arrangement shown in FIG. 9, wherein the pawl lever 70 is bifurcated at an intermediate portion thereof so as to form two distal ends of the pawl lever respectively corresponding to the lock wheel 38 and the ratchet wheel 58. According to this arrangement, by altering the lengths of the two distal ends of the pawl lever, it is possible to freely set the radii of the lock wheel 38 and the ratchet wheel 58 with no need to take into consideration the relationship between the radius of the lock wheel 38 and the ratchet wheel 58 as with the above-described embodiment.

As described above, in accordance with the present invention, the takeup shaft and the ratchet wheel are rotated relatively to each other with a light frictional force at the time of the actuation of the pawl lever, and are positively rotated integrally at the time of rotation of the takeup shaft in the webbing taking-up direction. Accordingly, the lock device for a webbing retractor in accordance with the present invention offers outstanding advantages in that wear of contact surfaces of the takeup shaft and the ratchet wheel can be mitigated, and the webbing is prevented from being taken up when the vehicle is run on a bumpy road.

What is claimed is:

1. A webbing lock device for a webbing retractor, comprising:
   a lock wheel having ratchet teeth around an outer peripheral portion thereof and adapted to follow by an urging force the rotation of a takeup shaft in a drawing-out direction of a webbing worn by a seat occupant of a vehicle;
   a pawl lever for meshing engagement with one of said ratchet teeth so as to cause said lock wheel to undergo a delay in rotation relative to said takeup shaft;
   lock means for stopping the rotation of said takeup shaft in the webbing drawing-out direction when said takeup shaft is rotated in the webbing drawing-out direction by a predetermined amount relative to said lock wheel as a result of the drawing out of the webbing after said lock wheel meshes with said pawl lever; and
   a ratchet wheel which is disposed coaxially with said takeup shaft and has around an outer peripheral portion thereof external ratchet teeth capable of meshing with said pawl lever, said ratchet wheel being adapted to receive a rotating force of said takeup shaft in the webbing drawing-out direction via a frictional force when said takeup shaft rotates in the webbing drawing-out direction, while said ratchet wheel is rotated integrally with said takeup shaft by engaging with said takeup shaft when said takeup shaft rotates in a webbing taking-up direction, whereby said pawl lever is spaced apart from said ratchet teeth of said lock wheel by said external ratchet teeth when an amount of rotation of said takeup shaft in the webbing taking-up direction with said lock wheel meshing with said pawl lever is less than said predetermined amount;
   wherein, said takeup shaft has a rotary body disposed coaxially with said takeup shaft and adapted to rotate integrally with said takeup shaft, said rotary body having internal ratchet teeth which are adapted to impart said frictional force to said ratchet wheel by continuous resilient urging of a part of said ratchet wheel into slippable contact with said internal ratchet teeth when said takeup shaft rotates in the webbing drawing-out direction, and which are adapted to rotate said ratchet wheel by non-slipping engagement with said part of said ratchet wheel when said takeup shaft rotates in the webbing taking-up direction.

2. A webbing lock device for a webbing retractor according to claim 1, wherein said part of said ratchet wheel is arranged to be brought into contact with said internal ratchet teeth via its own resiliency.

3. A webbing lock device for a webbing retractor according to claim 2, wherein said part of said ratchet wheel is constituted by a distal end portion of an arm formed in such a manner as to curve in conformity with an outer periphery of said takeup shaft.

4. A webbing lock device for a webbing retractor according to claim 3, wherein a pair of said arms are provided symmetrically with respect to said takeup shaft.

5. A webbing lock device for a webbing retractor according to claim 1, wherein the outside diameter of said ratchet wheel is set to be greater than the outside diameter of said lock wheel, whereby the meshing engagement between said lock wheel and said pawl lever takes place simultaneously or later than the meshing engagement between said ratchet wheel and said pawl lever.

6. A webbing lock device for a webbing retractor according to claim 5, wherein each of said external ratchet teeth of said ratchet wheel has a guide surface for guiding said pawl lever in a direction in which said pawl lever meshes with one of said ratchet teeth of said lock wheel at the time when one of said external ratchet teeth is brought into meshing engagement with said pawl lever when said ratchet wheel rotates in the webbing drawing-out direction.

7. A webbing lock device for a webbing retractor according to claim 5, wherein said pawl lever has a bifurcated portion, and distal end portions of said bifurcated portion respectively correspond to said ratchet teeth of said lock wheel and said external ratchet teeth of said ratchet wheel.

8. A webbing lock device for a webbing retractor according to claim 1, wherein said ratchet wheel has a pair of arms provided in a side wall thereof, said part of said ratchet wheel is a claw provided at an end of said arm; each of said internal ratchet teeth of said rotor has a gradually inclined surface and a sharply inclined surface; said claw of said ratchet wheel is always kept in contact with said gradually inclined surface and adjacent said sharply inclined surface of said internal ratchet teeth with the resiliency of said arm of said ratchet wheel so as to undergo relative rotation between said rotor and said ratchet wheel when said rotor rotates in the webbing drawing-out direction while retaining said ratchet wheel, and so as to rotate said ratchet wheel with said rotor when said rotor rotates in the webbing taking-up direction.

9. A webbing lock device for a webbing retractor having a takeup shaft around which a webbing to be worn by a seat occupant of a vehicle is taken up by an urging force, said webbing lock device comprising:
   a lock wheel having ratchet teeth around an outer peripheral portion thereof and adapted to follow by an urging force the rotation of said takeup shaft in a webbing-drawing-out direction;
   a pawl lever for meshing engagement with one of said ratchet teeth so as to cause said lock wheel to undergo a delay in rotation relative to said takeup shaft;
   lock means for stopping the rotation of said takeup shaft in the webbing drawing-out direction when said takeup shaft is rotated in the webbing drawing-out direction by a predetermined amount relative to said lock wheel as a result of the drawing out of the webbing after said lock wheel meshes with said pawl lever;
   a disk-shaped rotary body disposed coaxially with said takeup shaft and adapted to rotate together with said takeup shaft; and
   a ratchet wheel which is disposed coaxially with said rotary body and has around an outer peripheral portion thereof external ratchet teeth capable of meshing with said pawl lever, said ratchet wheel being adapted to receive a rotating force of said takeup shaft in the webbing drawing-out direction via a frictional force between the same and said rotary body when said takeup shaft rotates in the webbing drawing-out direction, while said ratchet wheel is rotated integrally with said rotary body by engaging with said rotary body when said takeup shaft rotates in a webbing taking-up direction, whereby said pawl lever is spaced apart from the ratchet teeth of said lock wheel by said external ratchet teeth when an amount of rotation of said takeup shaft in the webbing taking-up direction with said lock wheel meshing with said pawl lever is less than said predetermined amount;

wherein said rotary body has internal ratchet teeth which are adapted to impart said frictional force to said ratchet wheel by continuous resilient urging of a part of said ratchet wheel into slippable contact with said internal ratchet teeth when said takeup shaft rotates in the webbing drawing-out direction, and which are adapted to rotate said ratchet wheel by nonslipping engagement with said part of said ratchet wheel when said takeup shaft rotates in the webbing taking-up direction.

10. A webbing lock device for a webbing retractor according to claim 9, wherein said part of said ratchet wheel is constituted by an arm which is formed in such a manner as to curve in conformity with an outer periphery of said takeup shaft and is adapted to be brought into contact with said internal ratchet tooth via its own resiliency.

11. A webbing lock device for a webbing retractor according to claim 10, wherein a recessed portion having a circular configuration in an axial view is provided in a central portion of said ratchet wheel, said rotary body being accommodated in said recessed portion.

12. A webbing lock device for a webbing retractor according to claim 11, wherein said arm is disposed on a bottom of said recessed portion.

13. A webbing lock device for a webbing retractor according to claim 12, wherein a pair of said arms are provided symmetrically with respect to said takeup shaft.

14. A webbing lock device for a webbing retractor according to claim 9, wherein the outside diameter of said ratchet wheel is set to be greater than the outside diameter of said lock wheel, whereby the meshing engagement between said lock wheel and said pawl lever takes place simultaneously or later than the meshing engagement between said ratchet wheel and said pawl lever.

15. A webbing lock device for a webbing retractor according to claim 14, wherein each of said external ratchet teeth of said ratchet wheel has a guide surface for guiding said pawl lever in a direction in which said pawl lever meshes with one of said ratchet teeth of said lock wheel at the time when one of said external ratchet teeth is brought into meshing engagement with said pawl lever when said ratchet wheel rotates in the webbing drawing-out direction.

16. A webbing lock device for a webbing retractor according to claim 9, wherein said pawl lever has a bifurcated portion, and distal end portions of said bifurcated portion respectively correspond to said ratchet teeth of said lock wheel and said external ratchet teeth of said ratchet wheel and are engageable with said ratchet teeth of said lock wheel and said external ratchet teeth of said ratchet wheel respectively.

17. A webbing lock device for a webbing retractor according to claim 9, wherein said ratchet wheel has a pair of arms provided in a side wall thereof, said part of said ratchet wheel is a claw provided at an end of said arm; each of said internal ratchet teeth of said rotor has a gradually inclined surface and a sharply inclined surface; said claw of said ratchet wheel is always kept in contact with said gradually inclined surface and adjacent said sharply inclined surface of said internal ratchet teeth with the resiliency of said arm of said ratchet wheel so as to undergo relative rotation between said rotor and said ratchet wheel when said rotor rotates in the webbing drawing-out direction while retaining said ratchet wheel, and so as to rotate said ratchet wheel with said rotor when said rotor rotates in the webbing taking-up direction.

* * * * *